(12) United States Patent
Zucker et al.

(10) Patent No.: US 12,243,353 B2
(45) Date of Patent: *Mar. 4, 2025

(54) IMAGE PROCESSING FOR TRACKING ACTIONS OF INDIVIDUALS

(71) Applicant: NCR Voyix Corporation, Atlanta, GA (US)

(72) Inventors: Brent Vance Zucker, Roswell, GA (US); Adam Justin Lieberman, Suwanee, GA (US)

(73) Assignee: NCR Voyix Corporation, Atlanta, GA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/239,039

(22) Filed: Apr. 23, 2021

(65) Prior Publication Data

US 2021/0241490 A1 Aug. 5, 2021

Related U.S. Application Data (63) Continuation of application No. 16/174,805, filed on Oct. 30, 2018, now Pat. No. 11,055,874.

(51) Int. Cl.
| | |
|---|---|
| *G06V 40/20* | (2022.01) |
| *G06T 7/20* | (2017.01) |
| *G06T 7/73* | (2017.01) |
| *G06V 10/20* | (2022.01) |
| *G06V 10/62* | (2022.01) |
| *G06V 20/52* | (2022.01) |

(52) U.S. Cl.
CPC ............... *G06V 40/20* (2022.01); *G06T 7/20* (2013.01); *G06T 7/74* (2017.01); *G06V 10/255* (2022.01); *G06V 20/52* (2022.01); *G06T 2207/20084* (2013.01); *G06T 2207/30196* (2013.01); *G06V 10/62* (2022.01)

(58) Field of Classification Search
CPC ... G06T 7/74; G06T 7/20; G06T 2207/20084; G06T 2207/30196; G06K 9/3241; G06K 9/00771; G06K 9/00335; G06K 2009/3291

See application file for complete search history.

(56) References Cited

U.S. PATENT DOCUMENTS

| | | | | |
|---|---|---|---|---|
| 9,177,225 | B1* | 11/2015 | Cordova-Diba | .......... G06T 7/12 |
| 9,223,404 | B1* | 12/2015 | Ivanchenko | .......... G06F 3/0304 |
| 9,721,168 | B2* | 8/2017 | Saptharishi | .......... G08G 1/0133 |

(Continued)

FOREIGN PATENT DOCUMENTS

| | | | | |
|---|---|---|---|---|
| CN | 102457680 B | * | 4/2015 | ......... G06K 9/00362 |
| EP | 3343443 A1 | * | 7/2018 | ....... G06K 19/06037 |
| JP | 2017502589 A | | 1/2017 | |

OTHER PUBLICATIONS

"U.S. Appl. No. 16/174,805, Advisory Action mailed Feb. 8, 2021", 3 pgs.

(Continued)

*Primary Examiner* — Charles T Shedrick
(74) *Attorney, Agent, or Firm* — Schwegman Lundberg & Woessner, P.A.

(57) ABSTRACT

Cameras capture time-stamped images of predefined areas. Individuals and item are tracked in the images. A time-series set of images are processed to determine actions taken by the individuals with respect to the items or to determine relationships between the individuals to the items.

19 Claims, 4 Drawing Sheets

(56) References Cited

U.S. PATENT DOCUMENTS

| | | | | |
|---|---|---|---|---|
| 10,346,659 | B1* | 7/2019 | Ahmed | G06Q 10/08 |
| 10,679,428 | B1* | 6/2020 | Chen | G06V 10/764 |
| 2006/0064384 | A1* | 3/2006 | Mehrotra | G08B 13/19686 |
| | | | | 348/E7.086 |
| 2012/0099765 | A1* | 4/2012 | Zheng | G06T 7/248 |
| | | | | 382/103 |
| 2013/0022234 | A1* | 1/2013 | U S | G06T 7/20 |
| | | | | 382/103 |
| 2014/0071287 | A1* | 3/2014 | Tu | G11B 27/28 |
| | | | | 348/150 |
| 2014/0132758 | A1* | 5/2014 | Saptharishi | G06V 20/54 |
| | | | | 348/149 |
| 2015/0248589 | A1* | 9/2015 | Broache | G06F 18/22 |
| | | | | 382/182 |
| 2016/0019514 | A1* | 1/2016 | Landers, Jr. | G06Q 20/202 |
| | | | | 705/23 |
| 2017/0068831 | A1* | 3/2017 | Hanis | G06K 19/0723 |
| 2017/0323376 | A1 | 11/2017 | Glaser et al. | |
| 2018/0096457 | A1* | 4/2018 | Savvides | G06V 10/764 |
| 2018/0157939 | A1* | 6/2018 | Butt | G06N 20/00 |
| 2018/0254065 | A1* | 9/2018 | Chen | G11B 27/34 |
| 2018/0308522 | A1* | 10/2018 | Ramey | H04N 21/4882 |
| 2019/0019017 | A1* | 1/2019 | Wang | G06F 16/55 |
| 2019/0050629 | A1* | 2/2019 | Olgiati | G06T 7/20 |
| 2019/0130165 | A1* | 5/2019 | Seshadri | G06F 18/24133 |
| 2019/0149725 | A1* | 5/2019 | Adato | H04N 1/00 |
| | | | | 348/158 |
| 2019/0333233 | A1* | 10/2019 | Hu | G01S 13/04 |
| 2020/0104591 | A1* | 4/2020 | Zucker | G06Q 10/0833 |
| 2020/0104594 | A1* | 4/2020 | Zucker | H04W 4/35 |
| 2020/0104595 | A1* | 4/2020 | Zucker | G06Q 20/208 |
| 2020/0104603 | A1* | 4/2020 | Zucker | G06V 40/107 |
| 2020/0134339 | A1* | 4/2020 | Zucker | G06F 18/217 |
| 2020/0134855 | A1* | 4/2020 | Zucker | G06T 7/13 |
| 2020/0134861 | A1* | 4/2020 | Zucker | G06V 20/52 |
| 2020/0311731 | A1* | 10/2020 | Maxilom | G07F 7/06 |
| 2020/0311803 | A1* | 10/2020 | Maxilom | G06V 20/20 |
| 2021/0035052 | A1* | 2/2021 | Waskin | G06T 7/70 |
| 2022/0292867 | A1* | 9/2022 | Zhang | G06T 7/73 |

OTHER PUBLICATIONS

"U.S. Appl. No. 16/174,805, Final Office Action mailed Nov. 27, 2020", 15 pgs.

"U.S. Appl. No. 16/174,805, Non Final Office Action mailed May 14, 2020", 12 pgs.

"U.S. Appl. No. 16/174,805, Notice of Allowance mailed Mar. 4, 2021", 5 pgs.

"U.S. Appl. No. 16/174,805, Response filed Jan. 29, 2021 to Final Office Action mailed Nov. 27, 2020", 10 pgs.

"U.S. Appl. No. 16/174,805, Response filed Aug. 14, 2020 to Non Final Office Action mailed May 14, 2020", 9 pgs.

EP Examination Report—Mar. 13, 2024.

EP Search Report—Jan. 29, 2020.

* cited by examiner

IMAGE PROCESSING FOR TRACKING ACTIONS OF INDIVIDUALS

CROSS-REFERENCE TO RELATED APPLICATION

This application is a continuation of U.S. patent application Ser. No. 16/174,805, filed Oct. 30, 2018, which applications and publications are incorporated herein by reference in their entirety.

BACKGROUND

Trying to identify individuals and objects from image frames are processor intensive, time consuming, and difficult tasks to say the least. However, attempting to identify actions that individuals take with respect to the objects within the image frames are even more difficult tasks.

Identifying actions taken from images and/or video can provide a wide range of solutions in the industry from frictionless stores to security. Yet, when an individual interacts with an object, the end result of the interaction can be difficult to discern and can change substantially from frame to frame. For example, an individual may pick an item off a shelf, hold the item for a some period of time, place the same item back on the same shelf or a different shelf, hand the item to another individual, and/or place the item in a shopping cart or bag of the individual or a different individual.

Existing image processing relevant to individual and item recognition is too slow (from a processing standpoint) to have any real-time value, and such processing is unable to properly discern important actions taken by individuals within the images/video.

As a result, determining relationships between individuals and objects for real-time image/video analysis have remained elusive problems the industry.

SUMMARY

In various embodiments, methods and a system for image processing to track actions of individuals are presented.

According to an embodiment, a method for image processing to track actions of individuals is presented. A time-series set of images is received and an action taken by a tracked person with respect to a tracked item is identified from the time-series set of images. A person identifier for the tracked person, an item identifier for the tracked item, and an action identifier for the action is provided.

DETAILED DESCRIPTION

Figure 1:
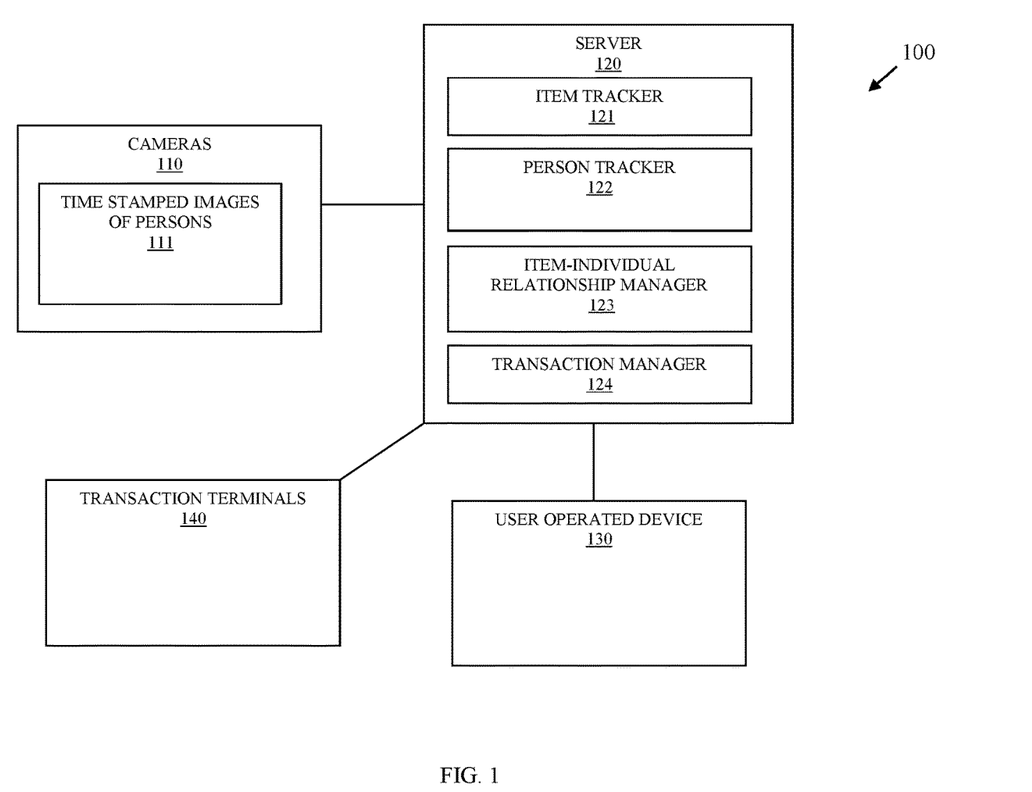
FIG. 1 is a diagram of a system for image processing to track actions of individuals, according to an example embodiment.

FIG. 1 is a diagram of a system 100 for image processing to track actions of individuals, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image processing to track actions of individuals, presented herein and below.

As used herein and below, the terms "customer," "consumer," "shopper," and "user" may be used interchangeably and synonymously.

The system 100 includes a plurality of cameras 110 that capture time-stamped images of persons, store structures, and store items (herein after just "defined area images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, an item-individual relationship manager 123, and a transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the relationship manager 123. In an embodiment, some of the images when streamed from the cameras 110 can be buffered or cached in memory of cache and made accessible from the memory or cache to the item tracker 121, the person tracker 122, and the relationship manager 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

The person tracker 122 uses this box in cooperation with the item tracker 121 to determine when a person within the store has picked up an item or removed an item from possession of the person while in the store.

The item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

In many cases, the item detected by the item tracker 121 may overlap with pixels assigned to a tracked person by the person tracker 122 in a same image frame. This permits an item identifier (known or unknown) to be assigned to a person identifier (known or unknown). However, subsequent image frames 111 may show that the person associated with the tracked person identifier is no longer in possession of the tracked item identifier for the item. This can occur for a variety of reasons, the person may have placed the item in a cart/bag, handing the item to a different tracked person, placed the item back on a shelf in the same spot that the item was obtained, placed the item back on the shelf in a different spot that the item was obtained, placed the item in a different cart/bag in possessing of a different tracked person, or handed the item to a different tracked person.

In other situations, the subsequent image frames 111 may not show a clear proximity between the pixels associated with the tracked person and the pixels associated tracked item.

Moreover, continually assigning and removing a tracked person's relationship to a tracked item from image frame 111 to image frame is processor intensive and time consuming, which could slow down responsiveness in a frictionless store implementation of the system 100.

To address these situations and concerns, the item-individual relationship manager 123 receives as input a time-series of image frames 111 associated with the tracked person.

In an embodiment, the time-series of image frames 111 is a time series of 8 image frames.

The item-individual relationship manager 123 can provide two different processing approaches to determine a relationship (action) between the tracked person and a tracked item.

In the first approach, the item-individual relationship manager 123 receives as input the time-series image frames 111 for the tracked person. Each frame 111 is cropped to include the pixel images associated with the attributes of the tracked person, which may also include overlapping pixels that are associated with the tracked item. A numerical matrix is created to hold each of the cropped images 111 from the time-series. The cropped images are provided as input to a trained neural network. The trained neural network is trained (based on training images and the known output expected) such that it outputs a plurality of action/relationship indicators that include one of: item picked up, item put down, no action was taken on the item. Based on the output from the trained neural network, the transaction manager 124 is notified if needed, notification includes the item identifier for the item, the person identifier for the person, and an add indication or remove indication. The transaction manager 124 (as discussed more completely below) maintains a shopping cart for each tracked person identifier.

It is noted that in the first approach, the known location for the item within the store is not a variable that is needed by the item-individual relationship manager 123 for resolving the action/relationship between the person and the item.

In a second approach, the item-individual relationship manager 123 is configured with a plurality of rules (processing conditions and processing actions in response to the conditions). The rules are based on the velocity and direction of velocity movement detected in the images 111 for the item. Here, the metadata associated with the cameras 110 that provided the images include locations within the store. A planogram can be used to map the cameras location to specific items known to be in those locations. The pixels in the images 111 are evaluated from frame to frame to identify movement of the item away from its known location or towards its known location. The item-individual relationship manager 123 evaluates the images 111 in the time series to derive a velocity and a direction for movement of the item. Each frame is time stamped, such that the velocity is capable of being calculated and the distance can be determined through evaluation of the pixels relative to the shelf that housed the item. The rules indicates that if the velocity exceeds a threshold and is in a direction away from the shelf, then the item-individual relationship manager 123 determines the item was picked up by the person being tracked.

Similarly, if the velocity exceeds the threshold and in a direction towards the shelf, then the item-individual relationship manager 123 determines the item was placed on the shelf by the person being tracked.

In an embodiment, if the second approach is used, the processing associated with the item-individual relationship manager 123 is subsumed into the item tracker 121 that tracks the items. In the second approach, the known location of the items being tracked is used, whereas in the first approach the known location of the items is unnecessary and does not have to be used for determining the action of the person being tracked with respect to the item being tracked.

Once the item-individual relationship manager 123 determines whether an item is picked up or put back (dispossessed by the person being tracked). The transaction manager 124 is notified with the person identifier and the item identifier. The transaction manager 124 maintains a shopping cart for each person (known identity or unknown identity). The transaction manager 124 is notified when items are to be added or removed from a particular person's shopping cart.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person, the person can check out at a transaction terminal 140; the transaction manager 124 interacts with an agent process on the transaction terminal 140 and provides the shopping cart items for payment when the person tracker 122 identifies the person as being present at the transaction terminal 140. When the person (identified or unidentified) has a mobile application downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

The item-individual relationship manager 123 provides a fine-grain analysis of a time-series of images 111 to determine actions that a person took with respect to an item. The actions can include possession of the item, dispossession of the item, or merely touched but did nothing with respect to the item. This allows for establishing the proper relationship between a person being tracked in the images 111 and an item being tracked in the images 111. Images 111 are processed in a time-series as a set of time ordered (sequentially in time) images 111 so as to reduce the number of decisions made with respect to the relationship between the person and the item, which improves processor throughput and correspondingly response times in arriving at relationship decisions on the server 120. Furthermore, the item-individual relationship manager 123 improves on the accuracy of any decision being made with respect to the relationship (action) taken by a tracked person with respect to a tracked item when processing the images 111.

In an embodiment, the transaction terminal 140 is one or more of: A Point-Of-Sale (POS) terminal and a Self-Service Terminal (SST).

In an embodiment, the user-operated device 130 is one or more of: a phone, a tablet, a laptop, and a wearable processing device.

These embodiments and other embodiments are now discussed with reference to the FIGS. 2-4.

Figure 2:
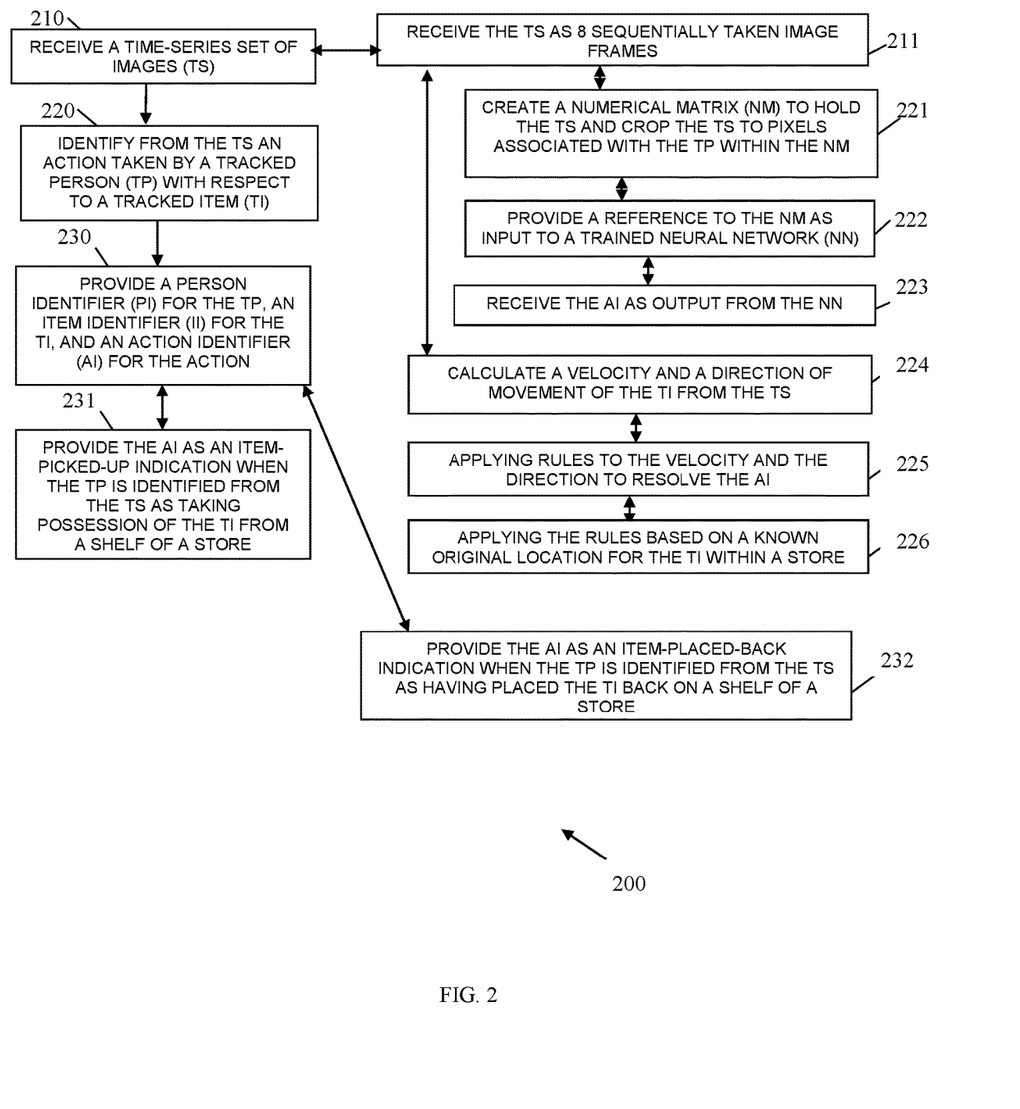
FIG. 2 is a diagram of a method for image processing to track actions of individuals, according to an example embodiment.

FIG. 2 is a diagram of a method 200 for image processing to track actions of individuals, according to an example embodiment. The software module(s) that implements the method 200 is referred to as an "action resolver." The action resolver is implemented as executable instructions programmed and residing within memory and/or a non-transitory computer-readable (processor-readable) storage medium and executed by one or more processors of a device. The processor(s) of the device that executes the action resolver are specifically configured and programmed to process the action resolver. The action resolver has access to one or more network connections during its processing. The network connections can be wired, wireless, or a combination of wired and wireless.

In an embodiment, the device that executes the action resolver is the server 120. In an embodiment, the server 120 is a cloud-based server.

In an embodiment, the action resolver is all or some combination of: the item tracker 121, the person tracker 122, and the item-individual relationship manager 123.

At 210, the action resolver receives a time-series set of images. In an embodiment, the time-series set of images is received from the person tracker 122 and/or the image tracker 121.

According to an embodiment, at 211, the action resolver receives the time-series set of images as 8 sequentially taken image frames.

At 220, the action resolver identifies from the time-series set of images an action taken by a tracked person with respect to a tracked item. In an embodiment, the tracked person is tracked by the person tracker 122 and the tracked item is tracked by the item tracker 121.

In an embodiment of 211 and 220, at 221, the action resolver creates a numerical matrix to hold the time-series set of images and the action resolver crops the time-series set of images to pixels associated with the tracked person within the numerical matrix.

In an embodiment of 221, at 222, the action resolver provides a reference to the numerical matrix as input to a trained neural network. In an embodiment, the trained neural network is the neural network discussed above with the FIG. 1. The trained neural network trained to provide output that identifies the action as a picked-up item, a put-down item, or touched item with no further action taken by the tracked person.

In an embodiment of 222, at 223, the action resolver receives the action identifier for the action as output from the trained neural network.

In an embodiment of 211 and 220, at 224, the action resolver calculates a velocity and a direction of movement of the tracked item from the time-series set of images.

In an embodiment of 224, at 225, the action resolver applies rules to the velocity and the direction to resolve the action identifier.

In an embodiment of 225, at 226, the action resolver applies the rules based on a known original location for the tracked item within the store, such as an original shelf location within the store for the tracked item.

At 230, the action resolver provides a person identifier for the tracked person, an item identifier for the tracked item, and the action identifier for the action. In an embodiment, the noted information is provided to the transaction manager 124 for purposes of adding the item identifier to a virtual shopping cart maintained for the tracked person or for purposes or removing the item identifier from the virtual shopping cart.

In an embodiment, at 231, the action resolver provides the action identifier as an item-picked-up indication when the tracked person is identified from the time-series set of images as taking possession of the tracked item from a shelf of a store.

In an embodiment, at 232, the action resolver provides the action identifier as an item-placed-back indication when the tracked person is identified from the time-series set of images as having placed the tracked item back on a shelf of a store.

Figure 3:
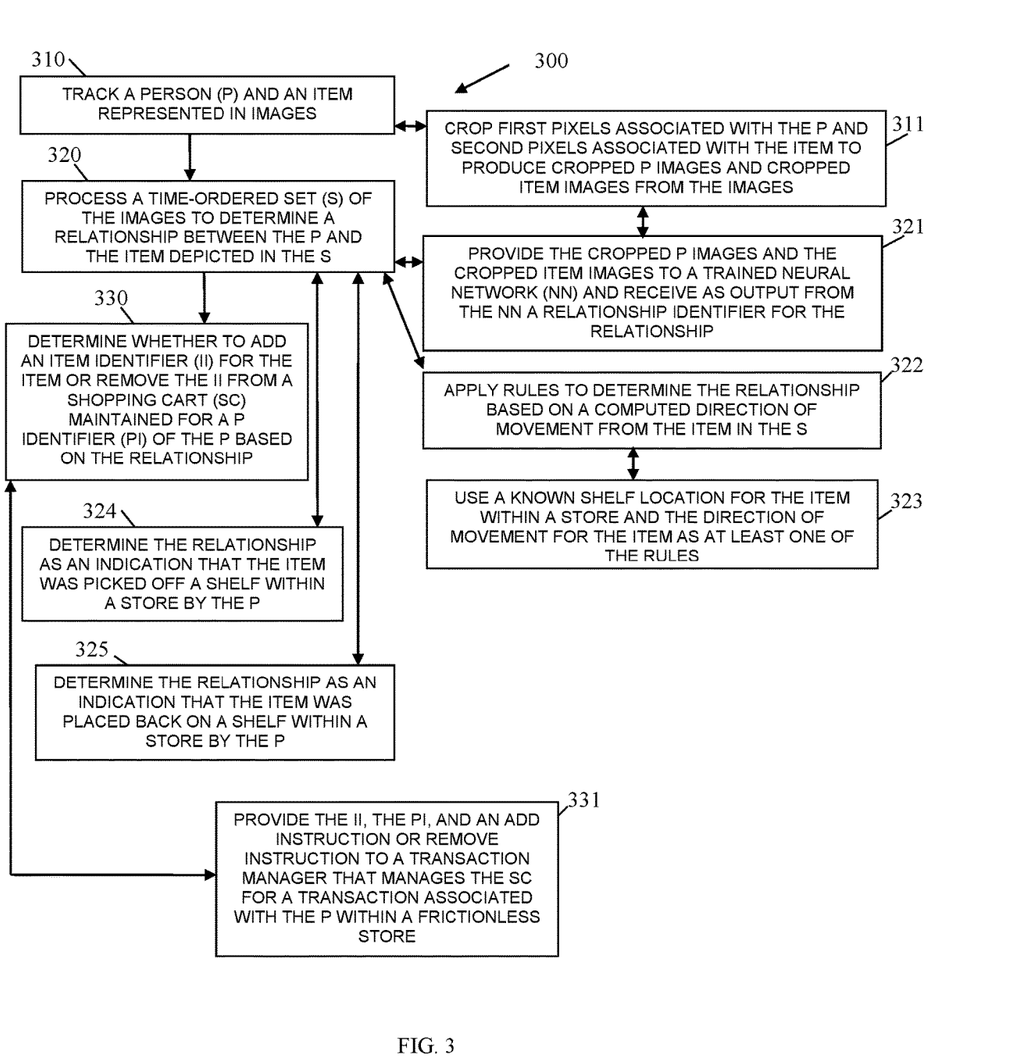
FIG. 3 is a diagram of another method for image processing to track actions of individuals, according to an example embodiment.

FIG. 3 is a diagram of another method 300 for image processing to track actions of individuals, according to an example embodiment. The software module(s) that implements the method 300 is referred to as a "person-item relationship manager." The person-item relationship manager is implemented as executable instructions programmed and residing within memory and/or a non-transitory computer-readable (processor-readable) storage medium and executed by one or more processors of a device. The processors that execute the person-item relationship manager are specifically configured and programmed to process the person-item relationship manager. The person-item relationship manager has access to one or more network connections during its processing. The network connections can be wired, wireless, or a combination of wired and wireless.

In an embodiment, the device that executes the person-item relationship manager is the server 120. In an embodiment, the server 120 is a cloud processing environment.

In an embodiment, the person-item relationship manager is all of or some combination of: the item tracker 121, the person tracker 122, the item-individual relationship manager 123, and/or the method 200.

The person-item relationship manager presents another and in some ways enhanced processing perspective of the method 200 discussed above.

At 310, the person-item relationship manager tracks a person and an item represented in images.

In an embodiment, at 311, the person-item relationship manager crops first pixels associated with the person and second pixels associated with the item to produce cropped person images and cropped item images from the images.

At 320, the person-item relationship manager processes a time-ordered set of images to determine a relationship between the person and the item depicted in the time-ordered set of images.

In an embodiment of 311 and 320, at 321, the person-item relationship manager provides the cropped person images and the cropped item images to a trained neural network and receives as output from the trained neural network a relationship identifier for the relationship. In an embodiment, the trained neural network is the trained neural network discussed above with the FIG. 1.

In an embodiment, at 322, the person-item relationship manager applies rules to determine the relationship based on a computed direction of movement from the item in the time-ordered set of images.

In an embodiment of 322, at 323, the person-item relationship manager uses a known shelf location from the item within a store and the direction of movement from the item as at least one of the rules.

In an embodiment, at 324, the person-item relationship manager determine the relationship as an indication that the item was picked off a shelf within a store by the person.

In an embodiment, at 325, the person-item relationship manager determines the relationship as an indication that the item was placed back on a shelf within a store by the person.

At 330, the person-item relationship manager determines whether to add an item identifier for the item or remove the item identifier from a virtual shopping cart maintained for a person identifier of the person based on the relationship.

In an embodiment, at 331, the person-item relationship manager provides the item identifier, the person identifier and an add instruction or a remove instruction to a transaction manager that manages the virtual shopping card for a transaction associated with the person within a frictionless store.

Figure 4:
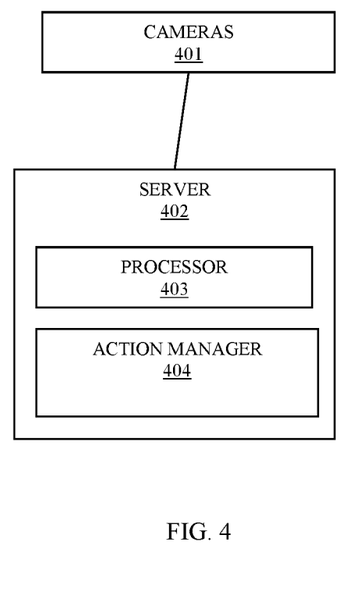
FIG. 4 is a diagram of a system for image processing to track actions of individuals, according to an example embodiment.

FIG. 4 is a diagram of a system 400 for image processing to track actions of individuals, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as an action manager 404.

The action manager 404 when executed from the non-transitory computer-readable storage medium on the processor 403 is configured to: track an individual and an item identified in images; determine an action taken by the individual with respect to the item from the images; add an item identifier for the item to a shopping cart assigned to a person identifier for the person when the action indicates that the person picked the item off a shelf of a store; and remove the item identifier for the item when present in the shopping cart when the action indicates that the person placed the item back on the shelf of the store.

In an embodiment, the action manager 404 is all of or some combination of: the item tracker 121, the person tracker 122, the item-individual relationship manager 123, the method 200, and/or the method 300.

In an embodiment, the action manager 404 is further configured to determine the action by one of: 1) provide a time-ordered set of the images to a trained neural network and receive as output an action identifier for the action and 2) determine the action identifier for the action based on a calculated velocity and direction of movement of the item within the time-ordered set of images relative to an original shelf location from the item within the store.

In an embodiment, the systems 100 and 400 and the methods 200 and 300 are deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1.

In an embodiment, the systems 100 and 400 and the methods 200 and 300 are deployed as a portion of a security implementation that monitors individuals and objects within a predefined space utilizing computer-vision and image processing as discussed herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
   tracking a person and an item from a time-stamped stream of images;
   assigning a unique person identifier for the person;
   isolating item pixels associated with the item from the time-stamped stream of images by removing first pixels associated with at least one individual and second pixels associated with at least one known background object;
   providing an item identifier for the item based on the item pixels once the isolated item pixels are sufficient to provide the item identifier after iterating the tracking, and the isolating as the person travels with the item within a store;
   wherein iterating further includes:
      updating metadata comprising at least one dynamic attribute for the item of the time-stamped stream of images; and
      refining the metadata from each current image processed with at least one additional or modified attribute identified with the current image processed;
   tracking movements of the item relative to the person from the time-stamped stream of images;
   determining a relationship between the item and the person based on the tracking using a trained neural network that takes as input the time-stamped stream of images and outputs the relationship by:
      creating a numerical matrix to hold the time-stamped stream of images;
      cropping the time-stamped stream of images to pixels associated with the person being tracked within the numerical matrix; and
      providing a reference to the numerical matrix as input to the trained neural network; and
   linking the item identifier to a virtual shopping cart maintained for the unique person identifier of the person when the relationship indicates that the person is in possession of the item.

2. The method of claim 1 further comprising, removing the item identifier from the virtual shopping cart when a subsequent relationship determined from subsequent images indicates that the person is no longer in possession of the item.

3. The method of claim 1 further comprising, processing a payment for the item and any other items assigned to the virtual shopping cart using a registered payment method associated with the unique person identifier when the person is tracked from the images leaving an egress point.

4. The method of claim 1 further comprising, providing item details for the item and any other items assigned to the virtual shopping cart to a transaction terminal when the person is tracked from the images as being present at the transaction terminal for processing a payment from the person for virtual cart items during a checkout.

5. The method of claim 1 further comprising, providing item details for the item and any other items assigned to the virtual shopping cart to a mobile application of a mobile device operated by the person for processing a payment from the person for virtual cart items during a checkout.

6. The method of claim 1, wherein tracking the person and the item further includes processing the time-stamped stream of images as sets of a time series of image frames that tracks the person within the store and with the item appearing in at least some of the image frames with the person.

7. The method of claim 6, wherein tracking the movements further includes calculating from the image frames a velocity and a direction of the movements of the item toward or away from a shelf.

8. The method of claim 7, wherein determining further includes assigning an in-possession relationship to the relationship when the velocity exceeds a threshold velocity and the direction is away from the shelf.

9. The method of claim 7, wherein determining further includes assigning a dispossessed relationship to the relationship when the velocity exceeds a threshold velocity and the direction is toward the shelf.

10. The method of claim 7, wherein determining further includes assigning a touched relationship to the relationship based on the velocity and the direction of the movement of the item.

11. The method of claim 1, wherein determining further includes processing at least one rule associated with a velocity and a direction of the movements for the item within the images and assigning the relationship as an in-possession relationship, a dispossessed relationship, or a touched relationship.

12. The method of claim 1, wherein cropping the time-stamped stream of images further includes storing each cropped image from the time-stamped stream of images in a time series of cropped images within the numerical matrix.

13. A method comprising:
    processing a time-stamped stream of images by tracking a person represented within the time-stamped stream of images relative to an item represented within the time-stamped stream of images;
    isolating the item within the time-stamped stream of images to obtain item pixels by removing individual pixels associated with at least one individual and removing background pixels associated with at least one background object;

assigning an item identifier to the item based on the item pixels associated the item once the item pixels are sufficient to provide the item identifier after iterating the processing and the isolating as the person travels with the items within a store;

wherein iterating further includes:
   updating metadata comprising that includes at least one dynamic attribute for the item of corresponding images; and
   refining the metadata from each current image processed before a subsequent image is processed with at least one additional or modified attribute identified with the current image processed;

tracking movements of the items within the images relative to the person and relative to at least one known shelf location of the item;

determining a relationship between the item and the person by:
   calculating a velocity and a direction of movement for the item from the time-stamped stream of images; and
   applying at least one rule associated with the velocity and the direction to resolve a relationship identifier for the relationship; and linking the item identifier for the item to a virtual shopping cart maintained for a unique person identifier assigned to the person based on the relationship between the person and the item and determined from the tracking.

14. The method of claim 13 further comprising, removing a particular item identifier from the virtual shopping cart when a particular relationship for the particular item identifier changes from an in-possession relationship to a dispossessed relationship indicating the person removed a particular item from a cart associated with the virtual shopping cart.

15. The method of claim 13 further comprising, processing a payment for the item using payment details associated with or provided by the person when the person is tracked from the time-stamped stream of images exiting an egress point of the store, tracked as being present at a transaction terminal within the store, or tracked as requesting checkout via a mobile application of a mobile device operated by the person within the store.

16. The method of claim 13, wherein tracking further includes maintaining additional metadata for the person, the item identifier, and the relationship as the time-stamped stream of images are sequentially processed as a time series.

17. The method of claim 16, wherein maintaining further includes updating the additional metadata associated with the relationship as changes in the movements of the item relative to the person are detected.

18. The method of claim 17, wherein adding further includes finalizing the relationship and the item identifier associated with the virtual shopping cart when the person is detected as taking an action associated an intention of the person to check out of a store with the item and pay for the item.

19. A system comprising:
   cameras situated throughout a store;
   a server comprising a processor and a non-transitory computer-readable storage medium;
   the non-transitory computer-readable storage medium comprising executable instructions;
   the executable instructions executed by the processor causing the processor to perform operations comprising:
      receiving time-stamped images from the cameras;
      tracking at least one person via at least one unique person identifier from the time-stamped images;
      tracking at least one item identifier for at least one item from the time-stamped images that are associated with the at least one person by isolating item pixels for other pixels associated with one or more of individuals or background objects of the store from the time-stamped images;
      matching corresponding item pixels to corresponding item identifiers for corresponding items once the corresponding item pixels are sufficient to provide the corresponding item identifiers after iterating the receiving, the tracking of the of the at least one person as the at least one person travels with the at least one item within the store;
      wherein iterating further includes:
         updating metadata comprising at least one dynamic attribute for the item of the time-stamped images; and
         refining the metadata from each current image processed before a subsequent image is processed with at least one additional or modified attribute identified with the current image processed;
      maintaining at least one relationship between the at least one item identifier and the at least one unique person identifier by:
         calculating at least one velocity and at least one direction of movement for the at least one item relative to at least one known shelf location for the at least one item; and
         applying at least one rule to the at least one velocity and the at least one direction of movement to resolve at least one relationship identifier for the at least one relationship; and
      linking at least one particular item to at least one virtual shopping cart associated with the at least one unique person identifier when at least one corresponding relationship indicates that at least one corresponding person has taken possession of the at least one particular items.

* * * * *